US008271394B1

(12) United States Patent
Bogaard

(10) Patent No.: US 8,271,394 B1
(45) Date of Patent: Sep. 18, 2012

(54) CONFIRMING LOCAL MARKETPLACE TRANSACTION CONSUMMATION FOR ONLINE PAYMENT CONSUMMATION

(76) Inventor: Erik T. Bogaard, Pasadena, CA (US)

(*) Notice: Subject to any disclaimer, the term of this patent is extended or adjusted under 35 U.S.C. 154(b) by 0 days.

(21) Appl. No.: 13/302,684

(22) Filed: Nov. 22, 2011

Related U.S. Application Data

(60) Provisional application No. 61/552,328, filed on Oct. 27, 2011.

(51) Int. Cl.
G06Q 20/00 (2012.01)
G06Q 30/00 (2012.01)

(52) U.S. Cl. .......... 705/64; 705/26.41; 705/75; 705/76; 705/77; 705/78

(58) Field of Classification Search .......... 705/26.1, 705/26.41, 64, 75, 76, 77, 78
See application file for complete search history.

(56) References Cited

U.S. PATENT DOCUMENTS

| 7,451,114 | B1 | 11/2008 | Matsuda et al. | |
| 7,512,567 | B2* | 3/2009 | Bemmel et al. | 705/67 |
| 7,581,257 | B1* | 8/2009 | O'Hara | 705/75 |
| 7,873,540 | B2* | 1/2011 | Arumugam | 705/17 |
| 8,135,647 | B2* | 3/2012 | Hammad et al. | 705/67 |
| 2003/0061168 | A1* | 3/2003 | Routhenstein | 705/64 |
| 2008/0052182 | A1* | 2/2008 | Marshall | 705/26 |
| 2008/0140447 | A1* | 6/2008 | Pourfallah et al. | 705/2 |
| 2009/0177581 | A1* | 7/2009 | Garcia et al. | 705/44 |
| 2011/0039585 | A1* | 2/2011 | Rouse et al. | 455/466 |
| 2012/0078749 | A1* | 3/2012 | Scipioni | 705/26.35 |

FOREIGN PATENT DOCUMENTS

| EP | 2189932 A1 * | 5/2010 |
| WO | WO-0075843 A1 * | 12/2000 |

OTHER PUBLICATIONS

Anon., "Priceline PerfectYardsale Turns the Internet into a Fast, Safe, Guaranteed Market for Neighbors to Buy and Sell the Quality Goods They no Longer Use," PR Newswire, Jan. 19, 2000.*
Ptacek, M.J., "Electronic Commerce: Processor Camps Clash in Person-to-Person Payment," American Banker, vol. 165, No. 103, p. 14, May 30, 2000.*
Anon., "UK Leads Smartcard Trials," Silicon.com, Feb. 8, 2002.*
"Authorize.Net, a CyberSource solution;" www.authorize.net, printed on Nov. 17, 2011, 1 page.

(Continued)

*Primary Examiner* — Nicholas D Rosen
(74) *Attorney, Agent, or Firm* — Khorsandi Patent Law Group, A Law Corporation; Marilyn R. Khorsandi

(57) ABSTRACT

Exemplary embodiment of the present invention would provide systems, including Internet-based systems, and computer-implemented methods, for providing online Buyers and Sellers who physically transact an exchange of an item at a local meeting place, indicia of confirmation of the exchange on which to base a background online payment. In particular, exemplary embodiments of the present invention would provide a way for Buyers and/or Sellers to input an identifier for online authentication to confirm that a physical exchange of an item sold had been transacted and that would accordingly provide an online system with a basis to charge the relevant Buyer's account for a sale amount and pay the Seller for the item sold.

23 Claims, 6 Drawing Sheets

OTHER PUBLICATIONS

"Braintree, High Risk Mechant Account: Third Party Payments Aggregation;" www.braintreepayments.com/blog/high-risk-merchant-account-third-party-payments-aggregation; printed on Nov. 17, 2011, 1 page.

"ebay, Welcome to Customer Support;" ocs.ebay.com/ws/eBayISAPI.dll?CustomerSupport; printed on Nov. 17, 2011, 1 page.

"half.com, an ebay company;" pages.half.ebay.com/help/seller/fulfull.html; printed on Nov. 17, 2011, 1 page.

"amazon services;" www.amazonservices.com/content/sell-on-amazon.htm?Id=AZFSSOA; printed on Nov. 17, 2011, 1 page.

"craigslist;" boston.craigslist.org; printed on Nov. 17, 2011, 1 page.

"PayPal;" https://www.paypal.com/webapps/mpp/merchant; printed on Nov. 17, 2011, 1 page.

"amazonpayments;" https://payments.amazon.com/sdui/sdui/business/overview; printed on Nov. 17, 2011, 1 page.

"Payment Professionals. Technology Visionaries. Service Fanatics.;" paypros.com; printed on Nov. 17, 2011, 1 page.

Landry, Lauren, "Bookzingo: A Cheap Way to Get Textbooks on Your Campus Without Ever Having to Visit the Bookstore", http://bostinno.com/2012/01/19/bookzingo-a-cheap-way-to-get-textbooks-on-your-campus-without-ever-having-to-visit-the-bookstore/, Jan. 19, 2012, Streetwise Media, 9 pages.

* cited by examiner

CONFIRMING LOCAL MARKETPLACE TRANSACTION CONSUMMATION FOR ONLINE PAYMENT CONSUMMATION

CROSS-REFERENCE TO RELATED APPLICATIONS

This application claims priority to U.S. Provisional Application Ser. No. 61/552,328, filed Oct. 27, 2011, entitled "CONFIRMING LOCAL MARKETPLACE TRANSACTION CONSUMMATION FOR ONLINE PAYMENT CONSUMMATION," the entire content and disclosures of which are incorporated for all purposes by reference herein as is fully stated herein.

FIELD OF THE INVENTION

The field of the present invention is online payment for transactions arranged online, and more particularly, confirming that a local marketplace transaction has been consummated for authorizing online payment consummation.

BACKGROUND OF THE INVENTION

Many online transactions are considered consummated at the point when the item ordered by an online customer is shipped. For example, customers routinely access the Internet to buy items from online stores. At an online store, a customer might browse items available, select an item for purchase, provide a method of payment, such as a credit card or PAYPAL® account number, and identify an address to which the item should be delivered. The online store then sends the item and charges the customer's account.

Alternatively, some stores, including online stores, choose to operate through an online marketplace, such as, for example, AMAZON®, or EBAY®. A customer's experience through an online marketplace is similar to purchasing through an online store, except that the store that actually delivers the purchased item to the address specified by the customer is not provided with payment information details. For example, a customer may purchase an item through an online marketplace by accessing the online marketplace, and similar to accessing an online store directly, browsing items available, selecting an item to purchase, providing a method of payment, such as credit card or PAYPAL® account number, and identifying an address to which the item should be delivered.

Once the customer submits the order, the online marketplace notifies the store, such as an online store, of the item order; the online marketplace notifies the store that the customer has authorized payment for the particular item and provides the store with the address to which the item should be delivered. The online marketplace, however, does not provide the store with any of the payment method details. Rather, the store must first send the item to the customer-indicated delivery address, and must provide a confirmation to the online marketplace that the item has been sent. One way by which stores provide such confirmation is by providing, for example, a USPS Delivery Confirmation number associated with the item sent.

The online marketplace requires receipt from the store of a confirmation that the item has been shipped before the online marketplace authorizes payment to the store according to the payment method authorized by the customer; the online marketplace takes some percentage of the payment as payment for having provided the online and payment services.

As can be seen from the above-outlined process, online transactions through online stores or through stores operating through online marketplaces, are considered to have reliably been consummated for payment authorization purposes upon confirmation that the item ordered has been shipped. That is, for purchases of items through online stores or stores operating through online marketplaces, shipment confirmation of an item is considered to provide reliable confirmation that the transaction has been consummated.

As compared to an online transaction for an item that is to be shipped by an online store, or for an item that is to be shipped by a store after notification by an online marketplace, some Internet websites allow purchasers to arrange for a local, physical, exchange of an item for payment. For example, CRAIGSLIST® provides listings of many different types of items for sale. As compared to an online purchase, a customer browses items for sale through CRAIGSLIST®. Instead of paying for the item through CRAIGSLIST®, the customer contacts the seller and arranges to meet the seller, in order to see the item and determine whether or not to purchase the item. For example, for a car, the customer would want to see the car and test drive it, before consummating its purchase. Once the customer is satisfied with the item, the customer would provide the seller with some form of payment.

The above-described type of transaction that involves a customer meeting a seller to physically exchange the item being purchased for payment may be referred to herein as a "local marketplace transaction." The physical exchanging of an item for payment may be referred to herein as a "local marketplace."

Issues sometimes arise with local marketplace transactions. One issue that sometimes arises is that a local marketplace buyer may provide the local marketplace seller with some form of payment that the seller cannot resolve for sufficient payment. For example, a buyer might provide a seller with a personal check for which there are insufficient funds.

As a result of the above-mentioned insufficient funds problem, some local marketplace sellers require cash payment. In some cases, however, the buyer-provided "cash'" may be counterfeit. In other cases, an unsuspecting buyer that brought cash for a local marketplace purchase, has been robbed.

Individuals that might want to sell an item through a website such as CRAIGSLIST® may not be in a position to accept credit cards for payment. Further, a customer may not feel comfortable providing an individual seller that the customer is meeting for the first time in a place such as a grocery store parking lot, or other minimal security location, with credit card information.

As compared to online purchases where shipment confirmation of an item is considered to provide reliable confirmation that the transaction has been consummated, websites that provide for the arrangement of local marketplace transactions have not facilitated online payment because there has been no way to reliably confirm that the local marketplace transaction has been consummated.

Some way is needed to reliably confirm that a local marketplace transaction has been consummated to facilitate reliable online payment consummation.

Further, some companies may not want to, or may not be in a financial position to, provide payment between buyers and sellers on their own website. Such a situation might be a temporary one. Or, for marketing reasons, some companies may want to advertise through a Payment Processor website, that is, a website to which customers provide payment account information, but through which, customers may purchase items from third-party companies. Some buyers may feel more secure providing their payment information to a Payment Processor website than to small operators. However, where companies act to facilitate transactions between third-party Buyers and Sellers, a Payment Processor website owner may not want to be responsible for authorizing payment to such companies unless the companies can provide some way for confirming to the Payment Processor that the transaction for which payment is requested has been completed (consummated). Where companies act to facilitate local marketplace transactions between third-party Buyers and Sellers, a way is needed to reliably confirm to a Payment Processor that the local marketplace transaction has been consummated to facilitate reliable online payment consummation by the Payment Processor.

SUMMARY OF THE INVENTION

Exemplary embodiment of the present invention would provide systems, including Internet-based systems, and computer-implemented methods, for providing online Buyers and Sellers who physically transact an exchange of an item at a local meeting place, indicia of confirmation of the exchange on which to base a background online payment. In particular, exemplary embodiments of the present invention would provide a way for Buyers and/or Sellers to input an identifier for online authentication to confirm that a physical exchange of an item sold had been transacted and that would accordingly provide an online system with a basis to charge the relevant Buyer's account for a sale amount and pay the Seller for the item sold.

Exemplary embodiments of the present invention would provide systems and computer-implemented methods for reliably confirming that a local marketplace transaction has been consummated thereby facilitating reliable online payment consummation for local marketplace transactions.

One exemplary embodiment of the present invention would provide an Internet-based computer system for confirming that a local marketplace transaction has been consummated; such an exemplary Internet-based computer system would comprise at least one exemplary server computer that would be programmed to: in response to a buyer request to purchase an item featured for sale by a seller, generate an identifier of a transaction for a sale of the item; store in a computer-accessible memory a record that would comprise a relationship between the identifier of the transaction, an identification of the buyer, and an identification of the seller; communicate the identifier of the transaction to the buyer; receive from the seller a communication of the identifier in combination with the identification of the seller; and charge an account associated with the buyer for an amount associated with the sale of the item. In one exemplary embodiment, the exemplary record would comprise a relationship between the identifier of the transaction, an identification of the buyer, an identification of the seller and an identification of the item.

In one exemplary embodiment of the present invention, the identifier would comprise a combination of human-readable characters; communicating the identifier of the transaction to the buyer would comprises communicating a message to a mobile telephone associated with the buyer that would comprise said combination of human-readable characters.

In one exemplary embodiment of the present invention, the identifier would comprise a machine-readable graphic symbology; communicating the identifier of the transaction to the buyer would comprise communicating a message to a mobile telephone associated with the buyer that would comprise a visual representation of said machine-readable graphic symbology.

BRIEF DESCRIPTION OF THE DRAWINGS

These and other features of the present invention are more fully set forth in the following description of exemplary embodiments of the invention. The description is presented with reference to the accompanying drawings in which.

DETAILED DESCRIPTION OF THE INVENTION

Figure 1:
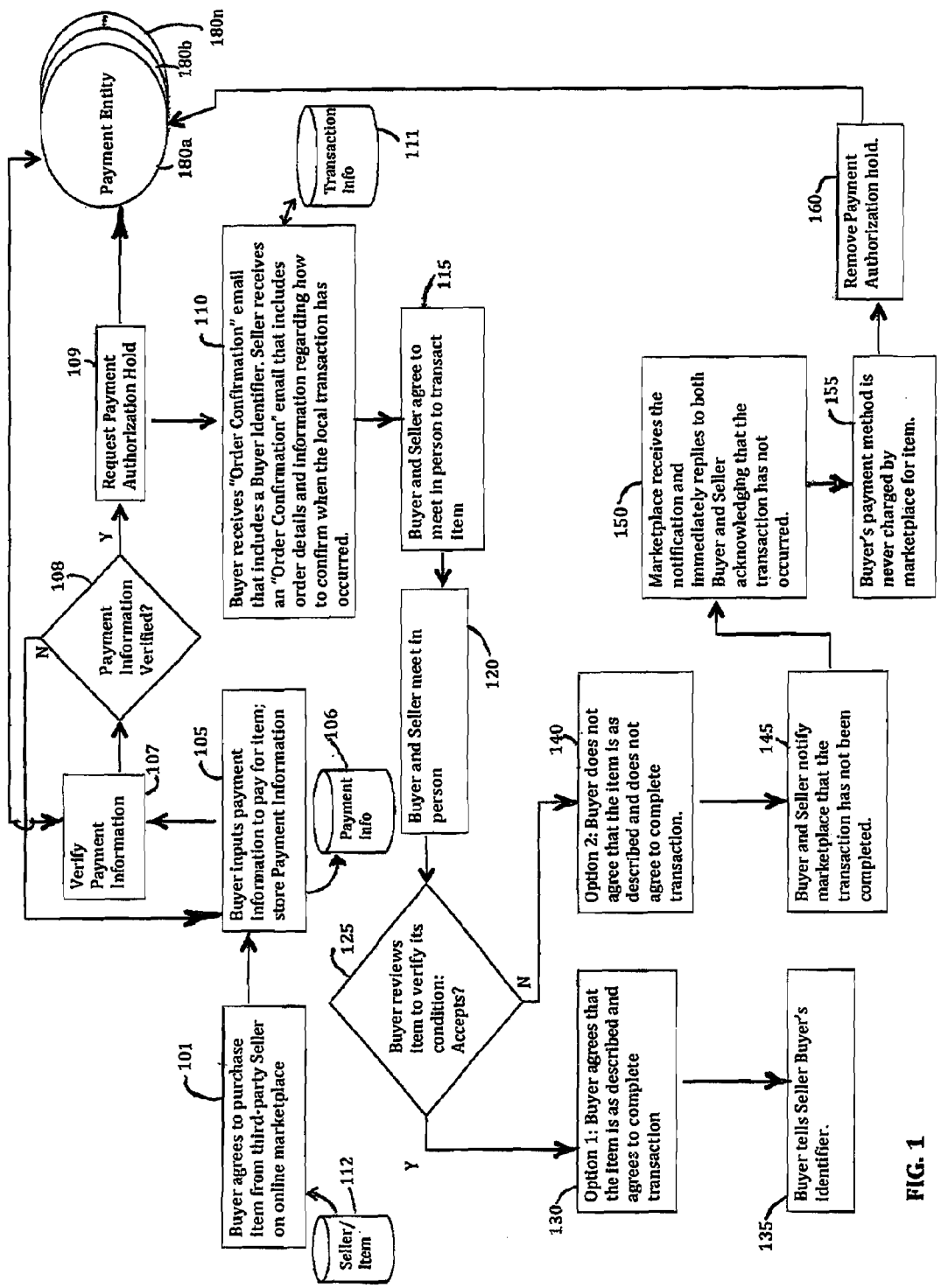
FIG. 1 depicts high-level logic functions for a Buyer's overview perspective of a local marketplace transaction in an exemplary embodiment of the present invention.

FIG. 1 depicts high-level logic functions for a Buyer's overview perspective of a local marketplace transaction in an exemplary embodiment of the present invention. With reference to FIG. 1, as depicted in exemplary logic function 101, an exemplary Buyer would search or browse an online marketplace website (as illustratively depicted by exemplary Seller/Item Information database 112) and would tentatively agree to purchase an item for an advertised sale amount. (or, alternatively, for a negotiated price such as may be negotiated through an auction web site, or through a buyer-posting web site, such as, for example, through www.zaarly.com, or through other buyer-seller negotiation business models) from a third-party Seller through the online marketplace (which may sometimes be referred to generally as exemplary online "Company A").

Reference herein to an advertised sale amount is illustrative and is not a limitation of the present invention. Rather, in some exemplary embodiments, an exemplary Buyer would negotiate a tentative sale amount for an item such as through an auction website. In other exemplary embodiments, an exemplary Buyer would tentatively agree to an advertised sale amount for an item. Yet other embodiments would provide exemplary Sellers with the opportunity to advertise an item for online auction, for online negotiation and/or for sale; exemplary Buyer's would either tentatively agree to an advertised price, or to a negotiated or auction bid price, as the case may be.

Exemplary embodiments would not be limited to seller-postings of items for sale. Rather, exemplary embodiments of the present invention could be used with buyer-posting driven business models (such as, for example, through www.zaarly.com), or through other buyer-seller negotiation business models whether now known or in the future discovered.

As further explained below, some exemplary embodiments would provide for local marketplace negotiations that could result in a modified final amount for the item as compared to the amount that the exemplary Buyer had initially tentatively agreed to online.

As will be understood by someone with ordinary skill in the art, the exemplary Buyer would be tentatively agreeing to purchase the item subject to the exemplary Buyer's later physical inspection and approval of the item listed for sale. As depicted in exemplary logic function 105, the exemplary Buyer would then input exemplary payment information to tentatively pay for the item that the exemplary Buyer has tentatively agreed to purchase; exemplary payment information would include, for example, a type of payment (e.g., credit card, debit card, bank identifier, PAYPAL®, or the like), a relevant account number, and other Buyer identification information that would be used to verify the payment information. The exemplary embodiment would store the payment information in an exemplary payment information database 106.

As depicted in exemplary logic function 107, the exemplary embodiment would then verify that the payment information that the Buyer had provided was valid; the verification would include a request to verify that the advertised sale amount would be authorized for charge against the Buyer-provided payment type and payment account. As depicted in exemplary logic function 107, to verify the Buyer's payment information, the exemplary embodiment would communicate with the relevant Payment Entity 180a-180n. For example, if the Buyer had provided a particular type of credit card, then the exemplary embodiment would communicate with the relevant Payment Entity that was associated with processing payment for the particular type of credit card.

As depicted by exemplary test logic function 108, the exemplary embodiment would determine from information that would have been provided by the relevant Payment Entity (e.g., one of exemplary Payment Entities 180a-180n) whether or not the Payment Information that had been provided by the Buyer was valid or not.

As depicted by the "N" (No) path from exemplary test logic function 108, if the Buyer Payment Information was not valid, or if the amount of the sale was not authorized, then the exemplary embodiment would notify the Buyer to input valid information (e.g., in exemplary logic function 105). On the other hand, if, as depicted by the "Y" (Yes) path from exemplary test logic function 108, the Buyer Payment Information was verified as being valid and the amount of the sale is authorized, then the exemplary embodiment would request 109 that the relevant Payment Entity (e.g., one of exemplary Payment Entities 180a-180n) put a Hold on a payment authorization against an account associated with the Buyer according to the Buyer Payment Information for the relevant advertised sale amount.

As will be understood by someone with ordinary skill in the art, in exemplary embodiments that may be implemented with auction or other business model-based sites, e.g., with buyer-posting sites, the relevant amount (as negotiated between the Buyer and Seller) of the sale would be the basis for the payment authorization and the Hold.

In one exemplary embodiment, an exemplary Hold as described above would be placed on a payment authorization for the relevant amount against a particular Buyer's account for a pre-established maximum number of days, e.g., for an exemplary pre-established maximum period of seven (7) days. In such an exemplary embodiment, if confirmation of the consummation of the relevant transaction between the Buyer and the Seller (as described further below) is not received before the expiration of the pre-established maximum number of days, then the exemplary Hold would be removed from the relevant Buyer's account, and the Buyer and the Seller would be notified that the Hold had been removed; the Buyer would be instructed to re-enter Payment Information, which would again be processed in a manner similar to that described above, and a new Hold would be placed on a payment authorization against the Buyer's account for the relevant amount.

Continuing with reference to FIG. 1, as depicted in exemplary logic function 110, the exemplary Buyer would receive an exemplary Buyer "Order Confirmation" email (from exemplary online "Company A") that would include an exemplary Buyer identifier (that would be generated by the exemplary embodiment and that would be stored on an exemplary transaction information database as illustratively depicted by exemplary transaction information database 111). In the exemplary embodiment, the exemplary Buyer identifier would be generated by the exemplary embodiment to be sufficiently unique to uniquely identify the particular Buyer during a particular period of time. As will be understood by someone with ordinary skill in the art, and as will be described in more detail below, various forms of a Buyer identifier could be generated without departing from the spirit of the present invention. In some exemplary embodiments, a Buyer identifier would be a human-readable combination of alphanumeric and/or special characters; in other exemplary embodiments, a Buyer identifier would comprise a machine-readable code, such as a machine-readable barcode, whether of a type now known or in the future discovered.

As further depicted in exemplary logic function 110, the exemplary Seller would receive an exemplary Seller "Order Confirmation" email (from an exemplary online marketplace such as exemplary online "Company A") that would include order details and information regarding, for example, how to confirm with the local marketplace transaction has been completed. In one exemplary embodiment, the exemplary Seller "Order Confirmation" email would include an exemplary Seller identifier (sometimes referred to herein as a "Seller-Transaction-Complete-Indicator") that would be generated by the exemplary embodiment to be sufficiently unique to uniquely identify the particular Seller and the particular transaction by the Seller during a particular period of time.

Continuing with reference to FIG. 1, as depicted in exemplary logic function 115, the exemplary Buyer and Seller would agree to meet in person to physically conduct the local marketplace transaction. In some embodiments, the exemplary online marketplace would enable the Buyer and Seller to anonymously exchange email messages in order to arrange a meeting for the Buyer to inspect the item. In other embodiments, the exemplary online marketplace would provide a Seller telephone number to the Buyer for the Buyer to contact the Seller and arrange to meet.

Continuing with reference to FIG. 1, as depicted in exemplary logic function 120, the exemplary Buyer and Seller would meet in person. As depicted in exemplary logic function 125, the exemplary Buyer would inspect the item.

If the exemplary Buyer does not agree to purchase the item, as depicted in exemplary logic function 140, then, as depicted in exemplary logic function 145, the exemplary Buyer and Seller would notify (such as by respective Buyer and Seller email messages) the exemplary online marketplace (e.g., exemplary Company A) that the transaction has not been completed. As depicted in exemplary logic function 150, the exemplary online marketplace would the receive the Buyer and Seller notifications and would respond with a confirmation to both the Buyer and the Seller that the transaction did not occur, and as depicted in exemplary logic function 155, would remove payment authorization for payment of the item, and as depicted in exemplary logic function 160, would notify the relevant Payment Entity (e.g., one of exemplary Payment Entities 180a-180n) to remove the previously-requested payment authorization hold against the relevant Buyer's payment information and account.

If, on the other hand, the exemplary Buyer accepts the item for purchase, then as depicted in exemplary logic function 130, the exemplary Buyer would agree to complete the transaction, and as depicted in exemplary logic function 135, would provide the Seller with the Buyer's exemplary Buyer identifier.

As will be understood by someone with ordinary skill in the art, the Buyer providing the Seller with the Buyer's exemplary Buyer identifier would provide the Seller with evidence that the Buyer has accepted the item and thereby consummated the local marketplace transaction. As will be described in more detail below with respect to FIGS. 2A-2C, the Seller would then provide the exemplary online marketplace with the Buyer's identifier, thereby confirming that the local marketplace transaction has been consummated so that the exemplary online marketplace would then have evidence that the local marketplace transaction has been consummated and would authorize payment consummation for the transaction. Processing of a Seller's confirmation that the local marketplace transaction has occurred is described further below with respect to FIGS. 2A-2C. In such an exemplary embodiment, as described further below, the exemplary online marketplace would require receipt of the Seller's input of the Buyer's identifier, as evidence that the local marketplace transaction had been consummated, before authorizing a charge for the item purchased to the Buyer's previously-authorized payment method.

As previously mentioned above, in an exemplary embodiment that placed an exemplary Hold on a payment authorization for a relevant tentative sale amount against a particular Buyer's account for a pre-established maximum number of days, e.g., for an exemplary pre-established maximum period of seven (7) days, if confirmation of the consummation of the relevant transaction between the Buyer and the Seller (such as receipt of the Seller's input of the Buyer's identifier, or in other embodiments as described elsewhere herein, receipt from the Seller and/or the Buyer of an authentic identifier) had not been received before the expiration of the pre-established maximum number of days, then the exemplary Hold would have been removed from the relevant Buyer's account, and unless the Buyer had re-entered Payment Information, then the exemplary embodiment would respond to an input by the Seller of the Buyer's identifier (or in other embodiments as described elsewhere herein, input from the Seller and/or the Buyer of an authentic identifier) with a notification that the previously-placed Hold against the Buyer's account had been removed and that if the Seller proceeded with the transaction, the Seller would do so at the Seller's own risk of possibly not receiving payment; such an exemplary embodiment would take the input (by the Buyer and/or the Seller) of the confirmation of the transaction as a subsequent Buyer authorization of payment to the previously-identified Buyer's account, and would at that point, process the payment authorization and attempt to charge the Buyer's account for the amount of the sale; if the Buyer's account could successfully be charged for the amount of the sale, such an exemplary embodiment would notify both the Buyer and the Seller that payment from the Buyer's account is successfully transferred to the Seller.

On the other hand, if the previously-placed Hold had expired against the Buyer's account, some exemplary embodiments would deny completion of such a transaction altogether.

If, on the other hand, confirmation of the consummation of the relevant transaction between the Buyer and the Seller is received by such an exemplary embodiment before the expiration of the pre-established maximum period of time, then the exemplary embodiment would notify both the Buyer and the Seller that payment from the Buyer's account is successfully transferred to the Seller.

In some alternative embodiments, both the Buyer and the Seller would provide each other with their respective identifiers, and the online marketplace would receive either the Buyer's input of the Seller's identifier, or the Seller's input of the Buyer's identifier, as evidence that the local marketplace transaction had been consummated. In such an alternative embodiment, the exemplary online marketplace would accept receipt of either, or both, the Seller's input of the Buyer's identifier, and/or the Buyer's input of the Seller's identifier, as evidence that the local marketplace transaction had been consummated, before authorizing a charge for the item purchased to the Buyer's previously-authorized payment method.

As a further alternative, the Seller could provide the Buyer with the Seller's identifier and the online marketplace would receive the Buyer's input of the Seller's identifier as evidence that the local marketplace transaction had been consummated. In such an exemplary embodiment, the exemplary online marketplace would require receipt of the Buyer's input of the Seller's identifier, as evidence that the local marketplace transaction had been consummated, before authorizing a charge for the item purchased to the Buyer's previously-authorized payment method.

As yet a further alternative, rather than generate a transaction-specific identifier, in some further alternative exemplary embodiments, a Buyer could maintain a "Buyer's vault" and could set up one or more passwords to that Buyer's vault; whenever the Buyer decided to purchase an item for which the sale was arranged through the exemplary online marketplace, the Buyer would communicate the Buyer's password to the exemplary online marketplace to confirm that the transaction for the sale of the item had been completed. Because a Buyer might arrange for multiple transactions during a particular time period, such a further alternative exemplary embodiment may require that the Buyer provide the Buyer's password with an identification of the Seller (e.g., the Seller's telephone number) and/or the item (e.g., an SKU, an ISBN, or other identifier).

In one such further alternative exemplary embodiment, an exemplary Buyer would set up a different password, sometimes referred to as a "PIN", for each transaction that the Buyer anticipated conducting. That is, rather than the exemplary online marketplace system generating a transaction-specific Buyer identifier, the exemplary Buyer would setup a transaction-specific Buyer-specific PIN for each contemplated transaction. In such an embodiment, the exemplary online marketplace would facilitate the Buyer identifying an item that would be associated with a particular transaction-specific, Buyer-specific PIN. Then, if the Buyer decided to actually purchase the item, the Buyer would communicate the Buyer's transaction-specific password to the exemplary online marketplace to confirm that the transaction for the sale of the item had been completed. Some such further alternative exemplary embodiments would accept receipt of a particular transaction-specific, Buyer-specific PIN from either the Buyer or from the Seller.

Such a further alternative exemplary embodiment could provide a mobile application that would facilitate the Buyer's input (or in some embodiment, the Seller's input) of the Buyer's password and that would facilitate, such as with an online graphic user interface that would display each item that had previously been identified by the Buyer for potential purchase, the Buyer's (or in some embodiments, the Seller's)

selection of one or more items that comprised a particular sale transaction. Alternatively, a mobile application could be provided that identified a particular transaction, such as with an online graphic user interface that would display an identification of the Seller and an identification, such as an SKU, an ISBN, other identifier, or a photo) of the item to be bought.

Once such a further alternative exemplary embodiment received a Buyer's input (or in some embodiment, the Seller's input) of the Buyer's password and/or identification of the transaction (Seller and/or item(s)), the further alternative exemplary online marketplace embodiment would: communicate to both the Buyer and the Seller (e.g., through email, text message, Instant messaging, telephone message, or various other types of communication) that the Buyer (or in some embodiment, the Seller) had provided confirmation of the transaction; charge the Buyer's payment method account; and update the various databases (e.g., the exemplary Transaction Information database 111 and the exemplary Payment Information database 106).

With a Buyer-transaction-confirmation-notification-dependent embodiment, some Sellers might attempt to withhold transferring the item to the Buyer until receiving notification from the further alternative exemplary online marketplace embodiment that the transaction had been confirmed. However, such Seller behavior could defeat the basis for the confirmation, providing the Buyer with an excuse to return the item and/or request a chargeback.

Further, as will be understood by someone with ordinary skill in the art, once an item has changed hands, because the Seller is the party to whom payment would be owed, the Seller would be the party most likely to provide the exemplary online marketplace with confirmation that the transaction had been consummated.

Figure 2A:
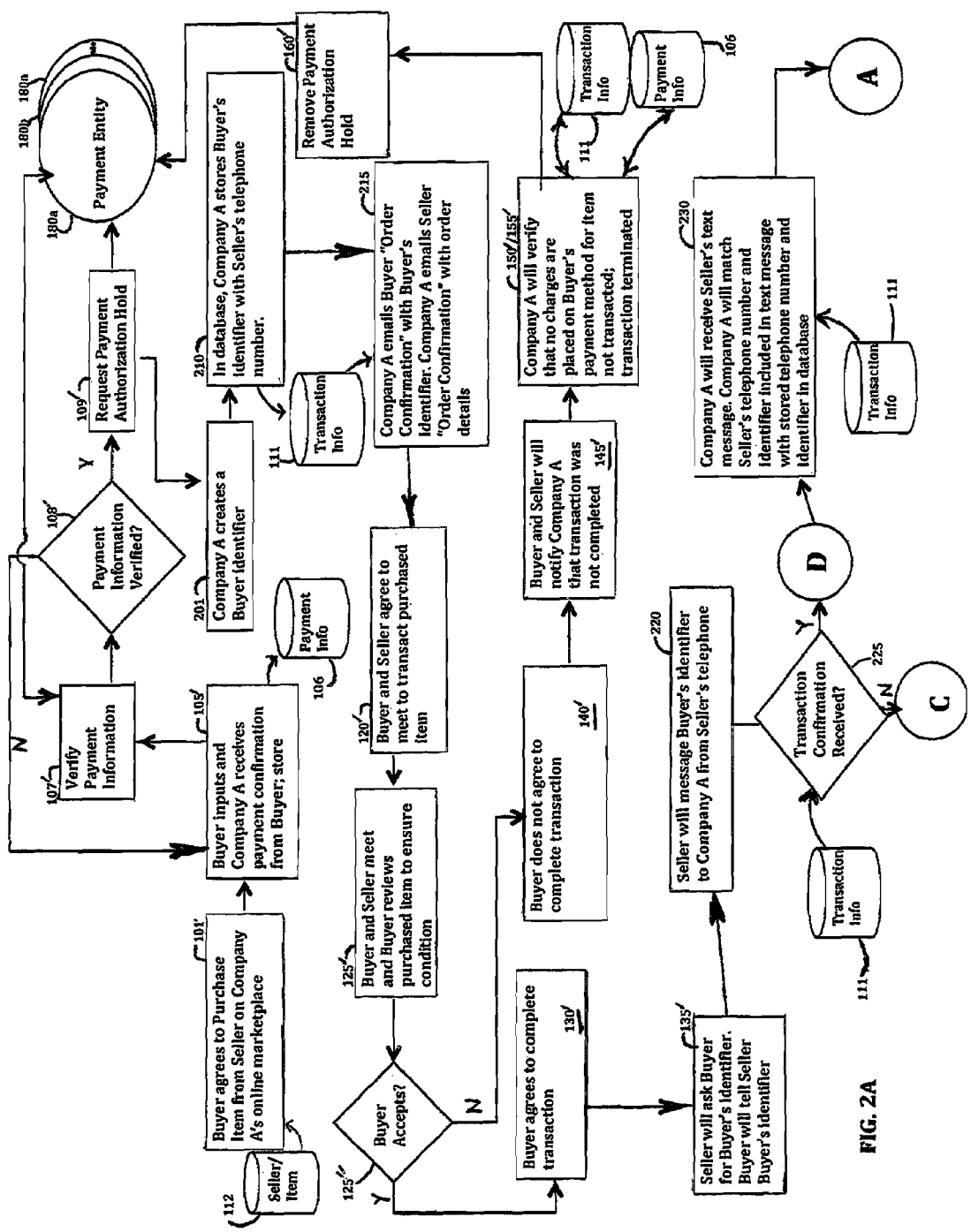
FIGS. 2A-2C depict high-level logic functions for processing a confirmation by a party to a local marketplace transaction of a consummation of the local marketplace transaction in an exemplary embodiment of the present invention.
Figure 2B:
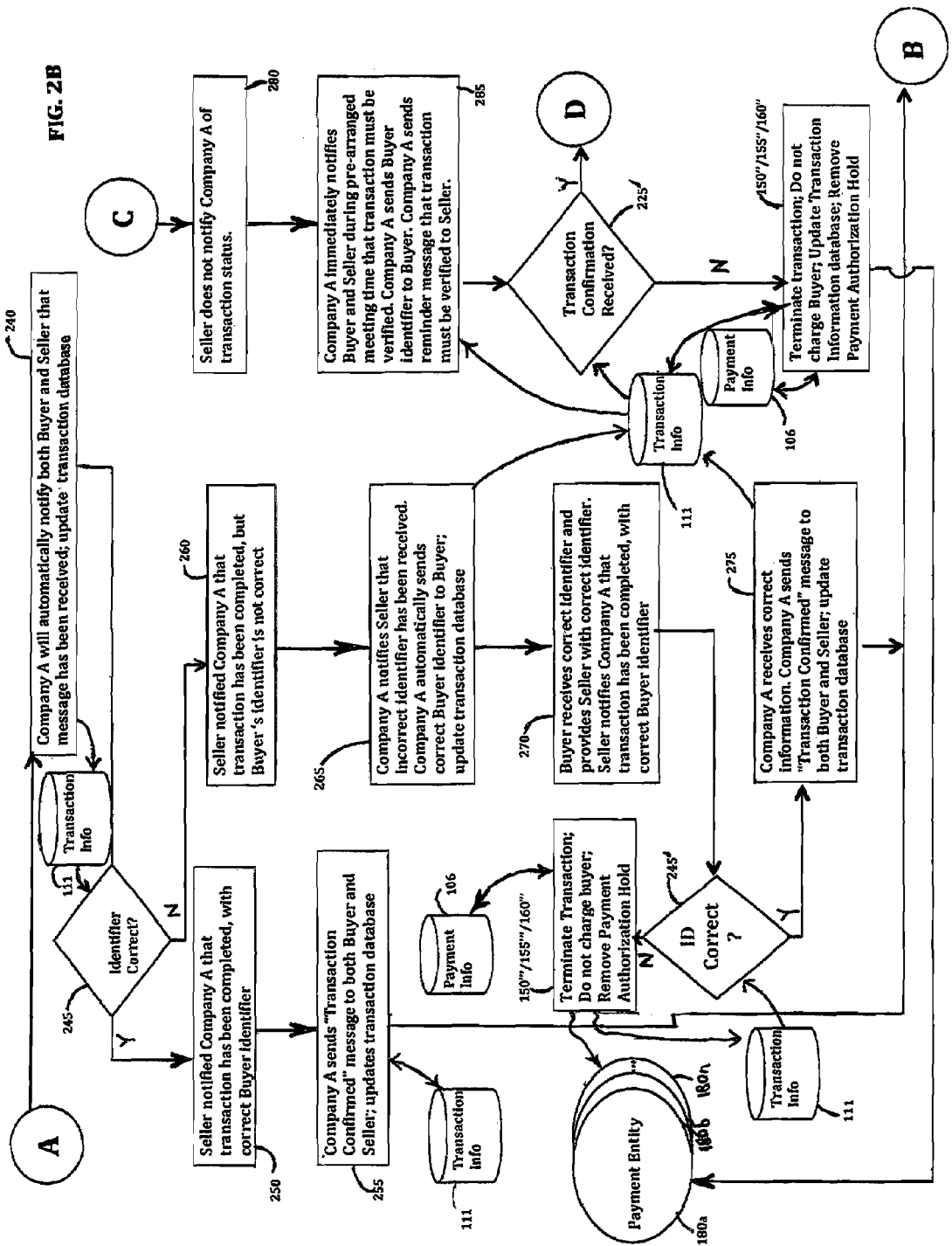
Figure 2C:
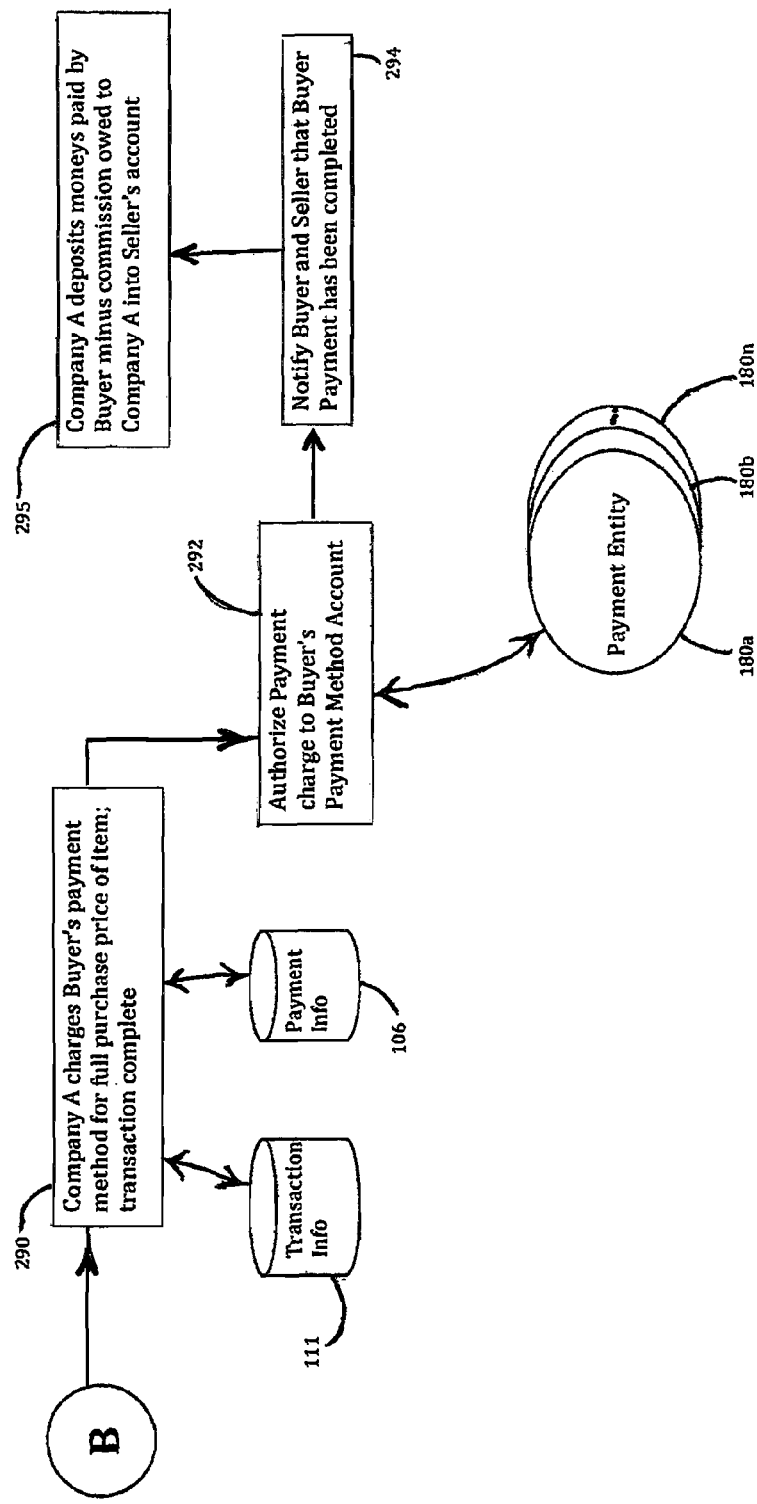

FIGS. 2A-2C depict high-level logic functions for processing a confirmation by a party to a local marketplace transaction of a consummation of the local marketplace transaction in an exemplary embodiment of the present invention. Initiating the high-level logic functions depicted in FIGS. 2A-2C are a number of logic function elements that are similar to those depicted in FIG. 1. In particular, with reference to FIGS. 2A-2C, as depicted in exemplary logic function 101', an exemplary Buyer would search or browse an online marketplace website (as illustratively depicted by exemplary Seller/Item Information database 112) and would tentatively agree to purchase an item from a third-party Seller through an online marketplace for an advertised sale amount. As depicted in exemplary logic function 105', the exemplary online marketplace would receive Buyer input of payment information to tentatively pay for the item that the exemplary Buyer has tentatively agreed to purchase and would store the Buyer input of payment information in an exemplary Payment Information database 106.

Then, as depicted in exemplary logic function 107', the exemplary embodiment would verify that the payment information that the Buyer had provided was valid; the verification would include a request to verify that the advertised sale amount would be authorized for charge against the Buyer-provided payment type and payment account. As depicted in exemplary logic function 107', to verify the Buyer's payment information, the exemplary embodiment would communicate with the relevant Payment Entity (e.g., one of exemplary Payment Entities 180a-180n). As depicted by exemplary test logic function 108', the exemplary embodiment would determine from information that would have been provided by the relevant Payment Entity (e.g., one of exemplary Payment Entities 180a-180n) whether or not the Payment Information that had been provided by the Buyer was valid or not.

As depicted by the "N" (No) path from exemplary test logic function 108', if the Buyer Payment Information was not valid, or if the amount of the sale was not authorized, then the exemplary embodiment would notify the Buyer to input valid information (e.g., in exemplary logic function 105'). On the other hand, if, as depicted by the "Y" (Yes) path from exemplary test logic function 108', the Buyer Payment Information was verified as being valid and the amount of the sale is authorized, then the exemplary embodiment would request 109' that the relevant Payment Entity (e.g., one of exemplary Payment Entities 180a-180n) put a Hold on a payment authorization against an account associated with the Buyer according to the Buyer Payment Information for the relevant advertised sale amount.

Continuing with reference to FIGS. 2A-2C, as depicted in exemplary logic function 201, the exemplary online embodiment would generate an exemplary Buyer identifier (sometimes referred to herein as a "Buyer-Acceptance-Indicator"). As previously mentioned above, in the exemplary embodiment, the exemplary Buyer identifier would be generated by the exemplary online marketplace embodiment to be sufficiently unique to uniquely identify the particular Buyer during a particular period of time. As will be understood by someone with ordinary skill in the art, various forms of a Buyer identifier could be generated without departing from the spirit of the present invention. Some exemplary online marketplace embodiments would generate a Buyer identifier to comprise a human-readable combination of alphanumeric and/or special characters that would itself be a unique identifier during a particular period of time. In such an exemplary embodiment, the exemplary email message that would be sent to the Buyer (see, e.g., element 215, FIGS. 2A-2C), would contain within it the human-readable Buyer identifier. When the Buyer meets the Seller to assess the item, if the Buyer decides to purchase the item, the Buyer could show the Seller the Buyer's email message, or could say the identifier to the Seller, so that the Seller could then provide the Buyer's identifier to the exemplary online marketplace.

Other exemplary online marketplace embodiments would generate a Buyer identifier to comprise a human-readable combination of alphanumeric and/or special characters that would be unique when combined with the Buyer's or Seller's telephone numbers. In such an embodiment, the Seller would need to either email the exemplary online marketplace the Buyer's identifier from the Seller's cell phone, or would need to input the Buyer's identifier and the Seller's cell phone number, such as through a webpage for the exemplary online marketplace.

One exemplary embodiment would generate (create) an exemplary random hash string to identify the transaction; the exemplary embodiment would create a relationship between the transaction/random hash string and both the Buyer's cell phone number and the Seller's cell phone number. Some exemplary embodiments would generate an exemplary random hash string that would uniquely identify a particular transaction for the life of the system. Other exemplary embodiments would generate an exemplary random hash string that would uniquely identify a particular transaction for some period of time. Yet other exemplary embodiments would generate an exemplary random hash string that would uniquely identify a particular transaction when combined with the Buyer's and/or the Seller's cell phone number—in some exemplary embodiments, the combination would be unique for the life of the system; in other exemplary embodiments, the combination would be unique for some period of time.

One exemplary embodiment would generate an exemplary random hash key using a combination of a randomly generated identifier ("UUID") with an internal millisecond timer ("TickCount"). That is, the exemplary random hash key would equal UUID+TickCount.

Another exemplary embodiment would generate an exemplary random hash key using just the randomly generated UUID.

Depending on the embodiment, the exemplary random hash key could be rather long. The longer the hash key, the more difficult it might be for the user (Seller or Buyer, as the case/embodiment may be) to enter the hash key and/or to enter it accurately. As an alternative to sending the entire exemplary random hash key to the Buyer, some exemplary embodiments would also generate a shorter "PIN" code or key and would communicate only the PIN code/key to the Buyer, such as in an email to the Buyer's cell phone. In one such embodiment, the PIN code/key would be generated to be a unique identifier of the transaction for the particular Seller—that is, the PIN code/key would be unique for the particular Seller's cell phone number. In another such embodiment, the PIN code/key would be generated to be a unique identifier of the transaction for the particular Buyer and for the particular Seller—that is, the PIN code/key would be unique for the particular Buyer's cell phone number and for the particular Seller's cell phone number.

Yet other exemplary online marketplace embodiments would generate a Buyer identifier (a Buyer-Acceptance-Indicator) that would comprise a machine-readable code, such as a machine-readable barcode or other machine-readable symbology, whether of a type now known or in the future discovered. In such an exemplary embodiment, the exemplary email message that would be sent to the Buyer (see, e.g., element 215, FIGS. 2A-2C), would contain within it the machine-readable barcode or other machine-readable symbology. In such an embodiment, when the Buyer agrees to purchase the item, the Buyer would need to allow the Seller to use the Seller's cell phone, such as an intelligent cell phone with an infrared or other scanning device, or a digital camera, to scan or take a photographic image of the machine-readable barcode or other machine-readable symbology. The Seller would then use the Seller's cell phone to email the scanned/photographed information from the cell phone's scanning/photographing of the machine-readable barcode or other machine-readable symbology to the exemplary online marketplace.

Yet other exemplary online marketplace embodiments would generate a Buyer-Acceptance-Indicator that would comprise an image that could comprise a picture, or a combination of a picture and a phrase.

Although not shown in FIGS. 2A-2C, an alternative to exemplary logic function 201 would alternatively, or in addition to generating a Buyer-Acceptance-Indicator, would generate an exemplary Seller identifier (sometimes referred to herein as a "Seller-Transaction-Complete-Indicator") that would be generated in much the same ways as described above regarding exemplary generation of a Buyer-Acceptance-Indicator, and would, for example, be sufficiently unique to uniquely identify the particular Seller and the particular transaction by the Seller during a particular period of time.

Continuing with reference to FIGS. 2A-2C, as depicted in exemplary logic function 210, the exemplary embodiment would store the exemplary Buyer-Acceptance-Indicator (and/or, in other embodiments, the exemplary Seller-Transaction-Complete-Indicator) in a memory storage device, such as in a database, such as illustratively depicted by exemplary transaction information database 111, with a relationship to the Seller's telephone number, and in some embodiments, with a relationship to the Buyer's telephone number, and in some embodiments with a relationship to an identification of the item that is to be purchased; for embodiments that would store the exemplary Seller-Transaction-Complete-Indicator, a relationship between the exemplary Seller-Transaction-Complete-Indicator and the Buyer's telephone number would be stored, because the Buyer would communicate the exemplary Seller-Transaction-Complete-Indicator back to the exemplary online marketplace (e.g., exemplary Company A) to confirm that the local marketplace transaction had taken place (i.e., been consummated).

Some exemplary embodiments would store a relationship between an identifier of the transaction, an identification of the buyer, and an identification of the seller. Some exemplary embodiments would store a relationship between the identifier of the transaction, the identification of the buyer, the identification of the seller, and an identification of the item.

As will be understood by someone with ordinary skill in the art, any of various types of identifiers could be used to identify an item, including but not limited to, for example, SKU, ISBN (e.g., for books (International Standard Book Number)), a customized system-specific identifier, an Internet address at which a seller posts an advertisement for the item, or various other types and/or combination(s) of product identifiers.

Continuing with reference to FIGS. 2A-2C, as depicted in exemplary logic function 215, the exemplary embodiment would communicate, such as through an email, to the Buyer an exemplary Buyer's "Order Confirmation" that would comprise the exemplary generated Buyer's identifier (Buyer-Acceptance-Indicator) (which in the exemplary embodiment would be stored on exemplary Transaction Information database 111); the exemplary embodiment would also communicate, such as through an email, to the Seller, an exemplary Seller's "Order Confirmation" that would comprise order details, and if appropriate, an exemplary Seller-Transaction-Complete-Indicator.

Continuing with reference to FIGS. 2A-2C, as depicted in exemplary logic function 120', the Buyer and Seller would agree, such as through telephone calls, emails, anonymous marketplace emails, or the like, to meet to transact the exchange of the item to be purchased, for payment authorization.

When the Buyer and Seller meet, the Buyer would assess the item to be purchased as depicted in exemplary logic function 125' to determine whether or not to complete the transaction.

As depicted in exemplary test function 125", if the Buyer declines to accept (a "No" path), then the Buyer would not agree to complete the transaction 140', the Buyer and/or the Seller would notify the exemplary online marketplace (e.g., exemplary Company A) that the transaction was not completed 145', and the exemplary embodiment would terminate the transaction, and would not submit any charges against the Buyer's previously-indicated payment method 150'/155'; the exemplary Transaction Information database 111 and the exemplary Payment Information database 106 would be updated to show that the transaction had been terminated, and as depicted in exemplary logic function 160', the exemplary embodiment would notify the relevant Payment Entity (e.g., one of exemplary Payment Entities 180a-180n) to remove the previously-requested payment authorization Hold against the relevant Buyer's payment information and account.

As previously mentioned above, in an exemplary embodiment that placed an exemplary Hold on a payment authorization for a relevant tentative sale amount against a particular Buyer's account for a pre-established maximum number of days, e.g., for an exemplary pre-established maximum period of seven (7) days, if confirmation of the consummation of the relevant transaction between the Buyer and the Seller (such as receipt of the Seller's input of the Buyer's identifier, or in other embodiments as described elsewhere herein, receipt from the Seller and/or the Buyer of an authentic identifier) had not been received (i.e., the "Y" path from exemplary function 125" depicted in FIGS. 2A-2C) before the expiration of the pre-established maximum number of days, then the exemplary embodiment depicted in FIGS. 2A through 2C would follow the exemplary "N" path from exemplary test function 125", taking the expiration of the pre-established maximum number of days as an indication that the Buyer had not agreed to complete the transaction 140' and as a default notification by the Buyer and/or the Seller that the transaction was not completed 145'; the exemplary embodiment would terminate the transaction, and would not submit any charges against the Buyer's previously-indicated payment method 150'/155'; the exemplary Transaction Information database 111 and the exemplary Payment Information database 106 would be updated to show that the transaction had been terminated; and as depicted in exemplary logic function 160', the exemplary embodiment would notify the relevant Payment Entity (e.g., one of exemplary Payment Entities 180a-180n) to remove the previously-requested payment authorization Hold against the relevant Buyer's payment information and account.

If, on the other hand, confirmation of the consummation of the relevant transaction between the Buyer and the Seller is received by such an exemplary embodiment such as depicted in exemplary test function 125" depicted in FIGS. 2A-2C before the expiration of the pre-established maximum period of time, then the exemplary embodiment would proceed with the exemplary "Y" path from exemplary test function 125" as described further below.

As depicted in exemplary test function 125", if the Buyer decides to accept (a "Yes" path), then the Buyer would agree to complete the transaction 130', the Buyer would provide the Seller with the Buyer's identifier (Buyer-Acceptance-Indicator) 135', and the Seller would communicate the Buyer's identifier (Buyer-Acceptance-Indicator) to the exemplary online marketplace (e.g., exemplary Company A) 220.

In the event that the Buyer had deleted the communication (e.g., the email, or text message) that provided the Buyer's identifier (Buyer-Acceptance-Indicator), the exemplary embodiment would provide for Buyer communications (using any of various media and forms as illustratively described herein) to request another copy of the Buyer's identifier (Buyer-Acceptance-Indicator).

In order to communicate a human-readable, e.g., alphanumeric/special character, Buyer's identifier (Buyer-Acceptance-Indicator) to the exemplary online marketplace, the Seller would send the exemplary online marketplace an email, text message, or Instant message, using the Seller's cell phone, or could call a telephone number associated with the exemplary online marketplace and verbally state the Buyer's identifier (Buyer-Acceptance-Indicator), or could use the Seller's phone's keypad to input the Buyer's identifier (Buyer-Acceptance-Indicator).

In order to communicate an image-based Buyer-Acceptance-Indicator, the Seller could photograph the image (including with a corresponding phrase, as the case may be) as it would be shown to the Seller by the Buyer on the display of the Buyer's cell phone; the Seller would then communicate the image (including with a corresponding phrase, as the case may be) to the exemplary online marketplace (e.g., exemplary Company A) to confirm consummation of the local marketplace transaction.

Alternatively, in order to communicate such an image-based Buyer-Acceptance-Indicator, the Seller could sign on to a Mobile App (as described in more detail below), and select an image and a phrase from a list of presented images and phrases that match the image and phrase presented in the Buyer-Acceptance-Indicator.

As will be understood by someone with ordinary skill in the art, there would be other ways, without departing from the spirit of the present invention, for exemplary embodiments to provide for Seller communication of such an image/phrase Buyer-Acceptance-Indicator. For example, the Seller could call a telephone number associated with the online marketplace and could select from a verbal list of image descriptions, an image description that matches the image presented in the Buyer-Acceptance-Indicator; and the Seller could select from a verbal list of phrases, the phrase that matches the phrase presented in the Buyer-Acceptance-Indicator, or alternatively, the Seller could use the cell phone's keypad to key in the phrase presented in the Buyer-Acceptance-Indicator.

The exemplary description above regarding generating and sending email messages to a Buyer, and receiving email messages from a Seller to confirm consummation of a local marketplace transaction are illustrative and non-limiting. Other ways of communicating the transaction identifier (random hash string, PIN code/key, or machine-readable symbology) could be used without departing from the spirit of the present invention. For example, the above-mentioned identifier (human-readable or machine-readable) could be communicated to a Buyer in a text message, or Instant Messaging, and could similarly be communicated to the exemplary online marketplace by a Seller using text or Instant messaging. As yet another alternative, a mobile application (Mobile App) could be provided; the Buyer would be provided with a sign-in PIN code/key. By signing into the Mobile App using the Buyer's sign-in PIN code/key, the Mobile App would present a screen that would comprise a Buyer-Acceptance-Indicator that would comprise, for example, a randomly generated hash string, a PIN code/key for the transaction, or a machine-readable symbology.

For a machine-readable symbology, the Seller could use the Seller's cell phone scanning device or digital camera to scan/photograph the Buyer-Acceptance-Indicator from the screen of the Buyer's cell phone. The Seller would then need to communicate that Buyer-Acceptance-Indicator to the online marketplace, such as for example, by signing into the Mobile App using a sign-on Seller's PIN code/key, and either typing in the Buyer-Acceptance-Indicator, or pasting a scanned-in or photographed copy of the Buyer-Acceptance-Indicator. Alternatively, as could be done with other embodiments described herein, the Seller could call a telephone number associated with the online marketplace and verbally repeat a code or type in a code using the phone keypad; or the Seller could text message the code to the online marketplace, or could access the online marketplace website (whether a full website or a mobile version the website) and provide the Buyer-Acceptance-Indicator.

As will be understood by someone with ordinary skill in the art, the description herein regarding exemplary use of Buyer and Seller cell phones is illustrative and not a limitation of the invention. Rather, intelligent devices that are capable of communicating using a communications network, such as PDA's (Personal Digital Assistants), IPADs®, and other such devices whether now known or in the future discovered, could be used.

Further alternatives for communicating the Buyer-Acceptance-Indicator to the Buyer (or in an alternative embodiment, communicating a Seller-Transaction-Complete-Indicator to the Seller), and/or for receiving a corresponding confirmation of the consummation of the relevant local marketplace transaction from the other of the two parties (Buyer or Seller) could include voice mail, automated telephone calls and messages to the Buyer and/or Seller, telephone calls to the Buyer and/or Seller, Mobile Apps, text messaging, Instant messaging, email, local online marketplace email, social media postings (e.g., through TWITTER®, FACEBOOK®, LINKEDIN®, GOOGLE®, or the like), pager communications, fax (facsimile) communications, and/or hardcopy mail.

As a yet further alternative, as compared to a system-generated code, a user (Buyer or Seller) could create their own transaction-specific code (comprising numbers, alphabetic characters, special characters, images (such as images that could be selected from a visual selection menu of images), or a combination of one or more images and text (alphanumeric and/or special characters).

Continuing with reference to FIGS. 2A-2C, as depicted in exemplary test logic function 225, the exemplary embodiment (as implemented by the exemplary online marketplace (e.g., exemplary Company A)) would determine whether or not a transaction confirmation, such as a Seller's communication, had been received. To determine whether or not a transaction confirmation had been received, the exemplary embodiment access the exemplary Transaction Information database 111.

As depicted by the "N" (No) path from exemplary test logic function 225, in the event that the exemplary online marketplace (e.g., exemplary Company A) did not receive any notification from either the Buyer or the Seller within some period of time, one exemplary embodiment would determine that no Seller confirmation of the transaction had been received 280 and would send 285, an exemplary supplemental communication to the Buyer and/or the Seller requesting confirmation that the transaction took place or was declined; the exemplary embodiment would include in the communication to the Buyer the Buyer's identifier.

As depicted in exemplary test logic function 225', the system would again access the exemplary Transaction Information database 111 to determine whether or not a transaction confirmation had been received. In the event that the exemplary online marketplace (e.g., exemplary Company A) still did not receive any notification from either the Buyer or the Seller (i.e., the "N" path (the No path)) from exemplary test logic function 225'), such as within some period of time (such as, for example, within an exemplary pre-established maximum number of days, as previously mentioned above), one exemplary embodiment would then automatically terminate the transaction, would not submit any charges against the Buyer's previously-indicated payment method as depicted in exemplary function(s) 150"/155"/160" and would update the exemplary Transaction Information database 111 and the exemplary Payment Information database 106 to show that the transaction had been terminated; as part of exemplary logic function 160", the exemplary embodiment would notify the relevant Payment Entity (e.g., one of exemplary Payment Entities 180a-180n) to remove the previously-requested payment authorization hold against the relevant Buyer's payment information and account.

If, on the other hand, as depicted by the "Y" path (the Yes path) from exemplary test logic function 225, the exemplary online marketplace embodiment determines that a transaction consummation confirmation has been received (and, in some exemplary embodiments, has been received within the previously-mentioned pre-established number of days), then the exemplary embodiment would receive the transaction consummation confirmation (e.g., would receive the Seller's communication of the Buyer's identifier (Buyer-Acceptance-Indicator), and/or would receive the Buyer's communication of the Seller-Transaction-Complete-Indicator) 230, and would compare the Seller's (and/or Buyer's) input with information on the aforementioned exemplary Transaction Information database 111 in order to attempt to find a match between the Seller's input of the Buyer's identifier (Buyer-Acceptance-Indicator) and the Seller's telephone number as stored on the aforementioned database.

As depicted in exemplary logic function 240, the exemplary embodiment would notify both the Buyer and the Seller that a transaction confirmation had been received and would update the exemplary Transaction Information database 111.

Then, if based on the comparison done as depicted in exemplary logic function 230, it is determined as depicted in exemplary test function 245 that the identifier provided (the Seller's communication of the Buyer's identifier (Buyer-Acceptance-Indicator), and/or the Buyer's communication of the Seller-Transaction-Complete-Indicator) matches the information stored on the database, then as depicted by the "Y" (Yes) path from exemplary test function 245, it would be determined 250 that the identifier that had been provided is correct, the exemplary embodiment would send 255 an exemplary "Transaction Confirmed" communication to both the Buyer and the Seller and would update the exemplary Transaction Information database 111, the exemplary embodiment would charge 290 the Buyer's previously-indicated payment method for the full purchase price of the item and would update the exemplary Transaction Information database 111 and the exemplary Payment Information database 106. As depicted by exemplary logic function 292, in order to charge the Buyer, the exemplary embodiment would authorize the relevant Payment Entity (e.g., one of exemplary Payment Entities 180a-180n) to charge the Buyer's payment method and account for the advertised sale amount; the relevant Payment Entity would confirm to the exemplary embodiment that payment had been charged; the exemplary embodiment would then notify 294 both the Buyer and Seller that payment had been made and confirmed. Then, the exemplary embodiment would, as depicted in exemplary logic function 295, deduct from the full purchase price of the item a commission for exemplary Company A, and would deposit the remaining amount into an account for the Seller.

Some exemplary embodiments would facilitate a revision of the sale price, such as may occur with local marketplace transaction negotiations. In one such exemplary embodiment, the Seller would be allowed to input an actual sale price that would be lower than the advertised sale amount; the exemplary embodiment would email the Seller's input of the actual sale price to the Buyer for confirmation; the Buyer's confirmation of the actual sale price would cause the exemplary embodiment to notify the relevant Payment Entity (e.g., one of exemplary Payment Entities 180a-180n) with an authorization to the relevant Payment Entity (e.g., one of exemplary Payment Entities 180a-180n) to charge the Buyer's payment method and account for the actual sale price and to remove any Hold on any amount difference between the actual sale price and the advertised sale amount.

In the exemplary embodiment, the exemplary "Transaction Confirmed" communication to the Buyer would comprise, among other things, some identifier, such as, for example, an exemplary Buyer confirmation password or passphrase that had previously been selected by the Buyer, or an exemplary Buyer confirmation image that had previously been selected by the Buyer, or some other exemplary Buyer confirmation identifier that had previously been selected by the Buyer; the exemplary "Transaction Confirmed" communication to the Seller would similarly comprise, among other things, some identifier, such as, for example, an exemplary Seller confirmation password or passphrase that had previously been selected by the Seller, or an exemplary Seller confirmation image, or some other exemplary Seller confirmation identifier that had previously been selected by the Seller. The exemplary respective Seller and Buyer confirmation identifiers would be provided to provide authenticity to the respective Seller and Buyer of the Transaction Confirmed communication so that the respective Seller and Buyer would know that the Transaction Confirmed communication had been sent by the exemplary online marketplace as opposed to having been sent by some unscrupulous party, such as by an unscrupulous Buyer or Seller.

If on the other hand, based on the comparison done as depicted in exemplary logic function 230, it is determined as depicted in exemplary test function 245 that the identifier provided (the Seller's communication of the Buyer's identifier (Buyer-Acceptance-Indicator), and/or the Buyer's communication of the Seller-Transaction-Complete-Indicator) did not match the information stored on the database, then as depicted by the "N" (No) path from exemplary test function 245, it would be determined 260 that the identifier that had been provided was incorrect, the exemplary embodiment would, as depicted in exemplary logic function 265, notify the Seller that the incorrect identifier had been received, would update the exemplary Transaction Information database 111, and would again send the Buyer the correct Buyer identifier. At that point, it would be possible as depicted in exemplary logic function 270 for the Buyer to provide the Seller with the correct identifier and for the Seller to provide the correct Buyer identifier to the exemplary online marketplace. Then, as depicted in exemplary logic function 275, the exemplary online marketplace (e.g., exemplary Company A) would access the exemplary Transaction Information database 111 and would confirm that the identifier provided is correct as depicted by the "Y" (Yes) path from exemplary test logic function 245', and if so, would send an exemplary "Transaction Confirmed" notification to both the Buyer and the Seller and would update the exemplary Transaction Information database 111; the exemplary embodiment would charge 290 the Buyer's previously-indicated payment method for the full purchase price of the item and would update the exemplary Transaction Information database 111 to reflect that the transaction had been confirmed as having been completed and would update the exemplary Payment Information database to reflect the charge to the Buyer's payment method account, the exemplary embodiment would, as depicted in exemplary logic function 295, deduct from the full purchase price of the item a commission for exemplary Company A, and would deposit the remaining amount into an account for the Seller. As will be understood by someone with ordinary skill in the art, charges to a Buyer's payment method account would be processed according to communications with appropriate credit card, debit card and/or other financial payment entities.

On the other hand, if it were determined that the provided identifier was still not correct (as depicted by the "N" (No) path from exemplary test logic function 245', the exemplary embodiment would terminate the transaction and would not charge the Buyer as depicted in exemplary logic function 150''' and 155'''/160'''; the exemplary embodiment would update the exemplary Transaction Information database 111 and the exemplary Payment Information database 106 to show that the transaction had been terminated; as part of exemplary logic function 160''', the exemplary embodiment would notify the relevant Payment Entity (e.g., one of exemplary Payment Entities 180a-180n) to remove the previously-requested payment authorization hold against the relevant Buyer's payment information and account. In such event, some exemplary embodiments would flag the Seller for more stringent review for future proposed transactions.

Some exemplary embodiments would further provide for the Buyer and/or Seller to communicate to the exemplary online marketplace a scheduled date and time for meeting. Some exemplary embodiments would automatically send the Buyer the Buyer's identifier just prior to the scheduled meeting and would automatically send the Seller a reminder of the scheduled meeting and that the transaction completion must be confirmed in order for payment to the Seller to be authorized. Some exemplary embodiments would add an agreed-to meeting location, date and time to user calendars, such as, for example, an exemplary online-marketplace website meeting calendar, personal computer calendars, or calendars associated with email accounts for the Buyer and Seller (e.g., GOOGLE® CALENDAR).

In some exemplary embodiments, the form and/or media for such communications between the exemplary online marketplace and the Buyer and Seller would be definable by the respective Buyer and Seller. In some exemplary embodiments, the form and/or media for such communications could be limited depending on the type of device that the respective Buyer and/or Seller would be using. For example, for a Buyer and Seller that are each using intelligent phones with digital cameras or scanning devices, the exemplary embodiment would agree, if requested, to provide the Buyer identifier in the form of a machine-readable barcode; but if one or the other of the Buyer's or Seller's phones were not enabled to take digital photographs or scan images, then the exemplary embodiment would limit the form, and would, for example, communicate by email or text message.

Payment Processor Embodiments

Some online companies may not be in a position to provide payment completion through their own websites. Or, for other reasons, some online companies may prefer to operate through what will be referred to herein as "Payment Processors." In the context of describing alternative exemplary embodiments, the term Payment Processor will be understood to mean an online forum, such as an online Internet website, that would provide for user payment to third-party companies for purchases made through those third-party companies. An exemplary embodiment of the present invention could be implemented for payment to exemplary Company A through an exemplary Payment Processor.

A Payment Processor may refuse to process payments for an exemplary Company A unless and until the exemplary Company A can provide confirmation that each online transaction for which Company A demands payment has occurred. As was previously mentioned above, in circumstances where an online Company is itself responsible for selling an item, and where the online Company itself is responsible for shipping the item that is being sold to the purchaser, such an online Company may tender to the relevant online Payment Processor as confirmation that the relevant online transaction has been consummated, a shipping document, such as, for example, a Delivery Confirmation number associated with a shipping of the item.

Even with such a shipping-document-based transaction confirmation basis as described above, a purchaser may contest ever receiving the item, or alternatively, once the purchaser receives the item, may find it unacceptable and want to return it. When a purchaser returns an item, or contests ever receiving the item, a Payment Processor must process a charge back from the relevant online merchant (e.g., the exemplary Company A) and adjust the purchaser's payment method account for the amount of the refund/charge-back.

However, online companies, such as the exemplary Company A, that do not actually ship items to purchasers, would not be able to provide any type of shipment confirmation, and therefore, would need some other form of transaction consummation confirmation, to provide to, and that would be acceptable by, Payment Processors.

As will be described further below, exemplary embodiments of the present invention could be implemented in various ways to provide online marketplace companies, such as the exemplary Company A, that do not actually ship items to purchasers, with a reliable form of transaction consummation confirmation, that the online marketplace company could provide to, and that would be acceptable by, Payment Processors to confirm transaction consummation and provide a basis for the Payment Processor to charge the relevant purchaser's payment method account, and pay the relevant online marketplace company, or alternatively, pay the actual seller directly.

In one exemplary Payment Processor embodiment, an exemplary Payment Processor would store the Buyer's payment information on the Payment Processor's own website, but would require that exemplary online marketplace Company A (or other "Third-Party Payment Aggregator") implement an exemplary embodiment of the present invention on Company A's own website. In such an exemplary online-marketplace-based-Payment-Processor embodiment, the exemplary Payment Processor would agree to process payments for the relevant online marketplace (e.g., exemplary Company A) but would require that the relevant online marketplace process transaction arrangements substantially as described above with regard to FIG. 1 and could require that the relevant online marketplace process transaction consummation confirmations substantially as described previously above with regard to FIGS. 2A-2C.

Figure 3:
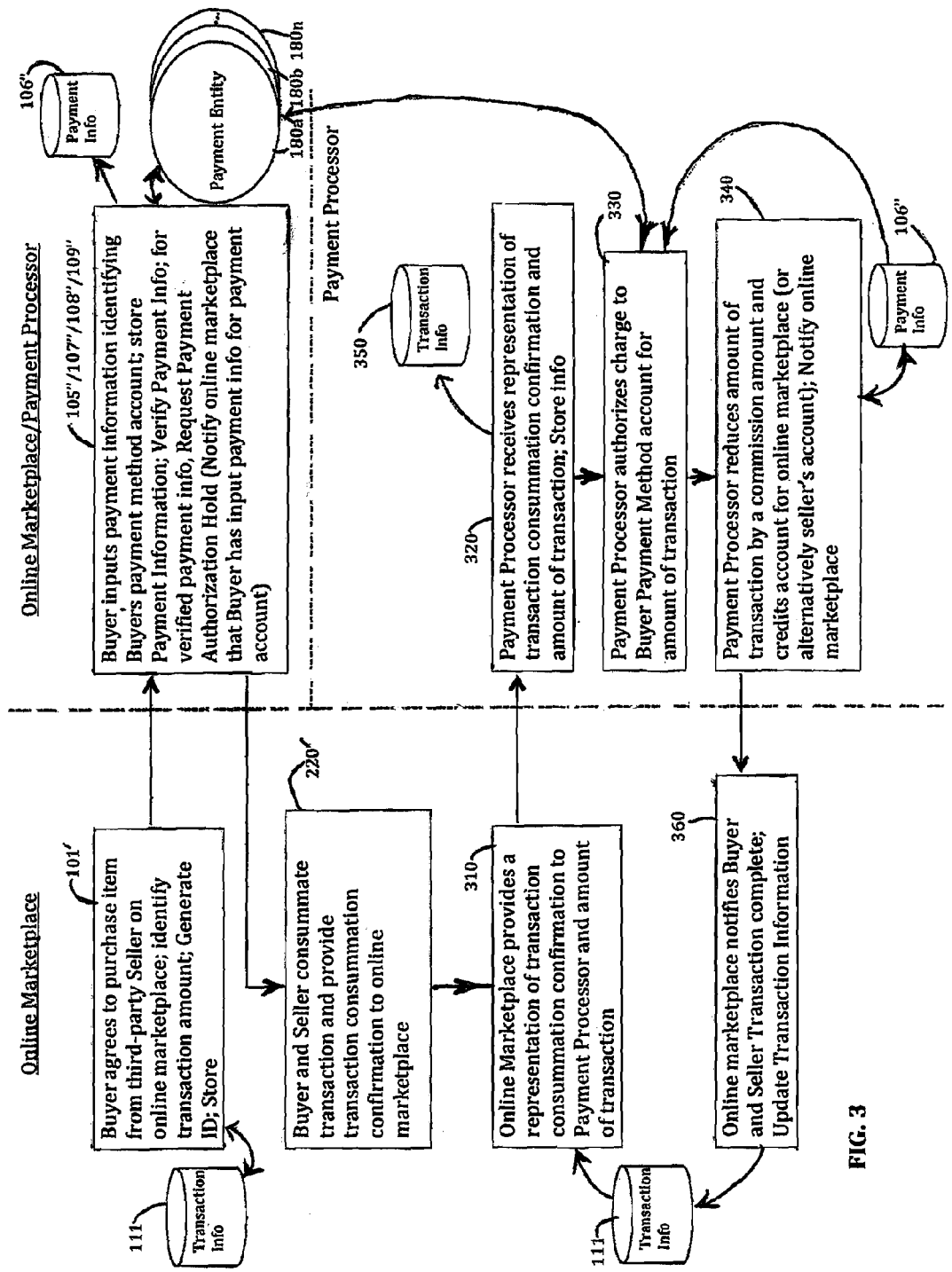
FIG. 3 depicts alternative high-level logic functions for an exemplary Payment Processor to process payments for third-party online marketplace companies in an exemplary embodiment of the present invention.

FIG. 3 depicts alternative high-level logic functions for an exemplary Payment Processor to process payments for third-party online marketplace companies in an exemplary embodiment of the present invention. One difference, or additional process, in such an exemplary online-marketplace-based-Payment-Processor embodiment, not shown in FIG. 1, would be that the relevant exemplary online marketplace would provide the Buyer's payment information and an amount for the transaction (see, e.g., the exemplary logic function identified by element number 105"/107"/108"/109" in FIG. 3) to the relevant Payment Processor.

Alternatively, in some embodiments, when a Buyer is to provide payment information, the payment information input pages could be provided so that the Buyer would directly input the payment method information into the Payment Processor's system as illustratively depicted in exemplary logic function 105"/107"/108"/109" depicted in FIG. 3. As part of exemplary logic function 105"/107"/108"/109" depicted in FIG. 3, the exemplary embodiment would verify payment information through communications with the relevant Payment Entity (e.g., one of exemplary Payment Entities 180a-180n), and for verified payment information, would request a Payment Authorization Hold for the amount of the proposed sale amount for the item. Payment information would be stored (whether by the exemplary online marketplace or by the exemplary Payment Processor) on an exemplary Payment Information database 106".

In one exemplary embodiment where the Buyer inputs payment method information directly into the Payment Processor's system/website, the Payment Processor would return the Buyer to the online marketplace website when the payment method information input had been completed, and would notify the online marketplace that the payment information had been successfully input for the relevant payment amount.

As compared to the processes depicted in FIGS. 1 and 2A-2C, another difference, or additional process, would be that the relevant exemplary online marketplace would provide the relevant Payment Processor with confirmation that a transaction had been consummated as described further below and as illustratively depicted at a high level by exemplary logic function 310 in FIG. 3.

In one exemplary online-marketplace-based-Payment-Processor embodiment, the exemplary Payment Processor would require that the relevant exemplary online marketplace notify the Payment Processor of the transaction completion confirmation as illustratively depicted in exemplary logic function 310 depicted in FIG. 3; upon receipt 320 of a transaction completion confirmation and an amount of the transaction from the relevant exemplary online marketplace, the exemplary Payment Processor would store information regarding the transaction in an exemplary database 350, and would access the exemplary Payment Information database 106" and would charge 330 the Buyer's account for the amount of the transaction, including communicating an authorization to the relevant Payment Entity (e.g., one of exemplary Payment Entities 180a-180n) to charge the Buyer's payment method and account for the amount of the transaction; as depicted in exemplary logic function 340, the exemplary Payment Processor would reduce the amount of the transaction by an amount of a commission, which would be deposited to the behalf of the Payment Processor, would then credit an account associated with the exemplary online marketplace (or alternatively, directly to an account for the third-party Seller) for the remaining amount, and would notify the exemplary online marketplace that payment for the transaction had been completed. The exemplary online marketplace would then notify 360 the Buyer and Seller that the transaction had been completed and would update transaction information on the exemplary Transaction Information database 111.

In some exemplary online-marketplace-based-Payment-Processor embodiments, the transaction complete confirmation number provided to the Payment Processor by the relevant exemplary online marketplace and saved by the exemplary Payment Processor would be unique, or substantially unique, during, for example, a particular period of time. The term substantially unique is used herein to mean that the relevant identifier is capable of identifying a particular transaction as distinct from other transactions, whether on its own, or when combined with some other factors, such as a date, a time, a date and a time, or other such information. Even though the transaction complete confirmation number provided to the Payment Processor would be substantially unique, it would not necessarily be the same as either the above-described exemplary "hash" string, or the exemplary PIN code/key. Rather, the exemplary online marketplace would conduct the exemplary transaction consummation confirmation process substantially as described above with regard to FIGS. 2A-2C, but, as an alternative to providing the Payment Processor with the above-described exemplary "hash" string, or the exemplary PIN code/key, could instead provide the exemplary Payment Processor with a separate alternative identifier for the same transaction.

In the event that the exemplary online marketplace provides an alternative transaction identifier as confirmation of a transaction (i.e., as a transaction complete confirmation number) that is not the same as either the above-described exemplary "hash" string, or the exemplary PIN code/key, the exemplary Payment Processor would require that, and the exemplary online marketplace (such as exemplary Company A) would, store a relationship between the transaction complete confirmation number provided to the Payment Processor by the exemplary online marketplace (such as exemplary Company A) and the Buyer identifier, the Seller identifier, the Buyer telephone number and the Seller telephone number. In the event that a chargeback (e.g., a return, or a Buyer "stop payment") issued, the Payment Processor would provide the transaction complete confirmation number to the exemplary online marketplace (such as exemplary Company A) so that the exemplary online marketplace (such as exemplary Company A) could apply the appropriate adjustment in the database(s) for the exemplary online marketplace system.

Figure 4:
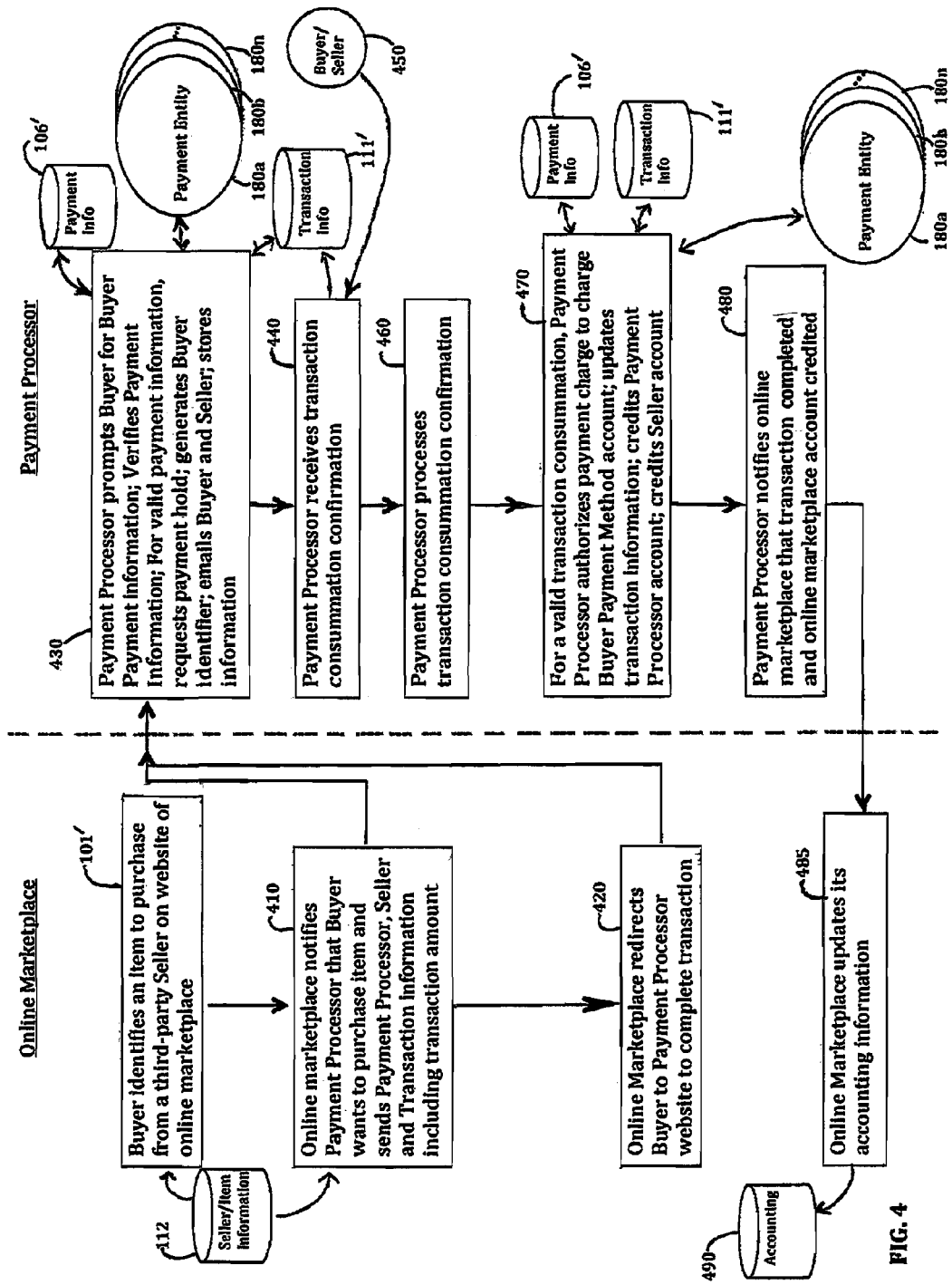
FIG. 4 depicts further alternative high-level logic functions for an exemplary Payment Processor for processing a confirmation by a party to a local marketplace transaction of a consummation of the local marketplace transaction in an exemplary embodiment of the present invention.

As an alternative to each online marketplace implementing a separate embodiment of the present invention, one alternative embodiment would be implemented through the Payment Processor's own website. FIG. 4 depicts further alternative high-level logic functions for an exemplary Payment Processor for processing a confirmation by a party to a local marketplace transaction of a consummation of the local marketplace transaction in an exemplary embodiment of the present invention.

As will be described further below, in one such self-implemented Payment Processor embodiment, the Payment Processor would store Seller and Buyer information, including the Buyer's payment information, and transaction verifications on the Payment Processor's own website. In such an embodiment, once an exemplary online marketplace has identified a Buyer who has agreed to tentatively purchase an item from a Seller identified on the website of the exemplary online marketplace, the rest of the transaction completion verification process that had been depicted and described previously above with regard to FIGS. 2A-2C would be handled through the Payment Processor's website rather than through the website of the exemplary online marketplace. In such an embodiment, the exemplary Payment Processor would stand in the shoes of the exemplary Company A depicted in FIGS. 2A-2C substantially beginning with exemplary logic function 105'. In such an embodiment, the exemplary Payment Processor would notify the exemplary online marketplace when a transaction has been completed and would credit an account for the behalf of the exemplary online marketplace with some percentage of the transaction amount for such a completed transaction. In such an embodiment, the exemplary online marketplace would essentially be outsourcing confirmation of transactions and payment for such transactions to the exemplary Payment Processor.

One exemplary self-implemented Payment Processor embodiment is illustratively depicted in FIG. 4. As depicted in FIG. 4, an exemplary Buyer would search or browse the website of an exemplary online marketplace (as illustratively depicted by exemplary Seller/Item Information database 112) and would identify 101' an item to purchase from a third-party Seller.

As illustratively depicted in exemplary logic function 410, the exemplary online marketplace would notify the relevant Payment. Processor that the Buyer wants to purchase a particular item from a particular third-party Seller and would send the relevant Payment Processor information regarding the Seller, the item and the proposed transaction, including a transaction amount. Then, as illustratively depicted in exemplary logic function 420, the exemplary online marketplace would redirect the Buyer to the Payment Processor's website to complete the transaction.

Then, as illustratively depicted in exemplary logic function 430, the exemplary Payment Processor would prompt the Buyer for Buyer Payment Method information, would verify the payment information with the relevant Payment Entity (e.g., one of exemplary Payment Entities 180a-180n), for valid payment information, would request the relevant Payment Entity (e.g., one of exemplary Payment Entities 180a-180n) to place an authorization hold on the Buyer's payment method and account for the relevant amount of the transaction, would generate Buyer identifier, would email the Buyer and the Seller the information previously described above regarding, for example, a Buyer identifier (and/or a Seller identifier), and would store the payment and transaction information on databases, such as exemplary Payment Information Database 106' and exemplary Transaction Information Database 111', on the Payment Processor's website. That is, once the exemplary online marketplace redirects the Buyer to the Payment Processor's website, the rest of the transaction completion verification process that had been depicted and described previously above beginning substantially with exemplary logic function 105' illustratively depicted in FIGS. 2A-2C, would be handled through the Payment Processor's website rather than through the website of the exemplary online marketplace.

The processes beginning substantially with exemplary logic function 105' illustratively depicted in FIGS. 2A-2C are illustratively summarized for the exemplary Payment Processor embodiment as exemplary summary logic functions 430, 440 (Payment Processor would receive transaction consummation confirmation from Buyer/Seller 450), 460 (Payment Processor would process transaction consummation confirmation), and 470 (For a valid transaction consummation confirmation, the Payment Processor would authorize the relevant Payment Entity (e.g., one of exemplary Payment Entities 180a-180n) to charge the Buyer Payment Method Account for the transaction amount; updates transaction information, and would credit an account for the Payment Processor with a percentage of the transaction amount and credits the Seller's account for the remainder, minus a percentage for the online marketplace). Once the transaction has been completed, the exemplary Payment Processor would then notify 480 the relevant online marketplace that the transaction had been completed and would credit an account for the online marketplace with a percentage of the transaction amount. The online marketplace would then update 485 its accounting information in an exemplary Accounting database 490.

Usefulness; Advantages

Some exemplary embodiments of the present invention would provide Buyer protections. For example, with exemplary embodiments of the present invention, a Buyer would not need to show up to a local meeting with a potential Seller with a lot of cash in the Buyer's pocket. Further, the Buyer would not be charged prior to viewing an item and agreeing to complete the purchase transaction.

Some exemplary embodiments of the present invention would also provide Seller protections. For example, Sellers, and online marketplaces that implement an embodiment of the present invention, could implement a no return/no refund policy because the transaction would not be completed, and the Buyer would not be charged, unless and until the Buyer meets the Seller, personally inspects the item, and agrees to purchase the item. For example, an online marketplace could implement a policy to instruct each Buyer to verify the condition of the item to be purchased during the Buyer's inspection meeting with the Seller; the policy could inform that Buyer that receipt of transaction confirmation would be confirmation that the buyer has: agreed to transaction; has actually met with seller; has verified the condition of the item as satisfactory; and has received the item.

Another Seller protection would be provided by the process of obtaining a payment authorization from a relevant Payment Entity, and requesting an immediate Payment Authorization Hold on the proposed amount of the transaction. Such an exemplary Payment Authorization Hold would accomplish verification of the Buyer's payment information and would assure that the amount for the transaction was verified and placed on hold (in some embodiments, only for some pre-established maximum number of days) pending confirmation of the transaction further to the remainder of the disclosed exemplary embodiment process. As mentioned above, some embodiments would facilitate negotiations between the Buyer and the Seller that could result in a different, for example, but not limited to, a lower-than-advertised price; the Seller could inform the exemplary embodiment of the revised price, the exemplary embodiment would confirm the revised price with the Buyer, and would then authorize the relevant Payment Entity to charge the Buyer for the finally negotiated price.

In view of the above-mentioned factors that would be confirmed by receipt of transaction confirmation, some exemplary embodiments of the present invention would also provide protection (to Sellers, online marketplaces and/or Payment Processors) from chargebacks and/or risk of chargebacks. For example, because receipt of a transaction confirmation would confirm that the buyer has: agreed to transaction; has actually met with seller; has verified the condition of the item as satisfactory; and has received the item, claims as to fraudulent sales and/or fraudulent delivery would be greatly reduced. The transaction consummation confirmation would provide the company (Seller, online marketplace, Payment Processor) with evidence that the transaction took place and that the Buyer had verified that the item was of a satisfactory condition prior to finalizing transaction and would thereby provide a basis for defense in the event of a chargeback.

Further, because exemplary embodiments of the present invention would facilitate safer local meetings to transact exchanges, there would be no need for shipping costs. Yet further, the verification by the Buyer that the item is of satisfactory condition would reduce the concern of companies that are involved in providing a marketplace for the exchange of items over which the company has no control. Further still, because exemplary embodiments would eliminate the need for a Buyer to show up to a local meeting with a potential Seller with a lot of cash in the Buyer's pocket for purchasing the item, the enhanced safety would reduce liability on the part of companies that provide an online marketplace for the exchange of items between Buyers and Sellers over which the company has no control.

Facsimile Reproduction of Copyright Material

A portion of the disclosure of this patent document contains material which is subject to copyright protection by the copyright owner, Erik T. Bogaard, and his successors and assigns. The copyright owner has no objection to the facsimile reproduction by anyone of the patent document or the patent disclosure, as it appears in the Patent and Trademark Office patent file or records, but otherwise reserves all copyright rights whatsoever.

ILLUSTRATIVE EMBODIMENTS

Although this invention has been described in certain specific embodiments, many additional modifications and variations would be apparent to those skilled in the art. It is, therefore, to be understood that this invention may be practiced otherwise than as specifically described. Moreover, to those skilled in the various arts, the invention itself herein will suggest solutions to other tasks and adaptations for other applications. Thus, the embodiments of the invention described herein should be considered in all respects as illustrative and not restrictive, the scope of the invention to be determined by the appended claims and their equivalents rather than the foregoing description.

What is claimed is:

1. An Internet-based computer system for confirming that a local marketplace transaction has been consummated, said Internet-based computer system comprising at least one server computer programmed to:
   in response to a buyer request to purchase an item featured for sale by a seller, generate an identifier of a proposed transaction for a proposed sale by the seller of the item;
   store in a computer-accessible memory a record comprising a relationship between the identifier of the proposed transaction, an identification of the buyer, and an identification of the seller;
   communicate the identifier of the proposed transaction to the buyer;
   receive from the seller a communication of a transaction identifier in combination with a seller identification; and
   respond to said receiving from said seller of said communication of said transaction identifier by performing steps comprising:
      determining whether the transaction identifier comprises the identifier of the proposed transaction, and
      for the transaction identifier that comprises the identifier of the proposed transaction, determining whether the seller identification matches the identification of the seller saved in said relationship with the identifier of the proposed transaction, and
      for the transaction identifier that comprises the identifier of the proposed transaction, and for the seller identification that matches the identification of the seller saved in said relationship with the identifier of the proposed transaction, charging an account associated with the buyer for an amount associated with the proposed sale of the item.

2. The Internet-based computer system of claim 1, wherein said record comprises a relationship between the identifier of the transaction, the identification of the buyer, the identification of the seller, and an identification of the item.

3. The Internet-based computer system of claim 1, wherein said item is featured for sale through said Internet-based computer system.

4. The Internet-based computer system of claim 1, wherein said item is featured for sale through a third-party Internet-based computer system.

5. The Internet-based computer system of claim 1, wherein said identification of the buyer comprises a mobile telephone number associated with the buyer.

6. The Internet-based computer system of claim 1, wherein said identification of the seller comprises a mobile telephone number associated with the seller.

7. The Internet-based computer system of claim 1, wherein the identifier comprises a combination of human-readable characters.

8. The Internet-based computer system of claim 7, wherein said communicate the identifier of the transaction to the buyer comprises communicating a message to a mobile telephone associated with the buyer, said message comprising said combination of human-readable characters.

9. The Internet-based computer system of claim 1, wherein the identifier comprises a machine-readable graphic symbology.

10. The Internet-based computer system of claim 9, wherein said communicate the identifier of the transaction to the buyer comprises communicating a message to a mobile telephone associated with the buyer, said message comprising a visual representation of said machine-readable graphic symbology.

11. A computer-implemented method for confirming that a local marketplace transaction has been consummated, said computer-implemented method comprising using at least one computer device programmed to:
  in response to a buyer request to purchase an item featured for sale by a seller, generate an identifier of a transaction for a sale of the item;
  store in a computer-accessible memory a record comprising the identifier of the transaction, an identification of the buyer, and an identification of the seller;
  communicate the identifier of the transaction to the buyer;
  receive from the seller a communication of a transaction identifier and a seller identifier;
  access said computer-accessible memory according to said transaction identifier and determine whether:
    the transaction identifier comprises the identifier of the transaction, and
    the seller identifier matches the identification of the seller stored with the identifier of the transaction; and
  for the transaction identifier that is determined to comprise the identifier of the transaction, and for the seller identifier that matches the identification of the seller stored with the identifier of the transaction, charge an account associated with the buyer for an amount associated with the sale of the item.

12. The computer-implemented method of claim 11, said at least one computer device further programmed to:
  for the transaction identifier that does not comprise the identifier of the transaction, notify the buyer and the seller that the transaction has not been completed.

13. The computer-implemented method of claim 11, wherein said record comprises the identifier of the transaction, the identification of the buyer, the identification of the seller, and an identification of the item.

14. The computer-implemented method of claim 11, wherein the identifier comprises a combination of human-readable characters.

15. The computer-implemented method of claim 14, wherein said communicate the identifier of the transaction to the buyer comprises communicating a message to a mobile telephone associated with the buyer, said message comprising said combination of human-readable characters.

16. The computer-implemented method of claim 11, wherein the identifier of the transaction comprises a machine-readable graphic symbology, and wherein said communicate the identifier of the transaction to the buyer comprises communicating a message to a mobile telephone associated with the buyer, said message comprising a visual representation of said machine-readable graphic symbology.

17. A computer-implemented method for confirming that a local marketplace transaction has been consummated, said computer-implemented method comprising using at least one computer device programmed to:
  receive a buyer request to purchase an item featured for sale by a seller for a particular sale amount;
  obtain buyer payment information;
  verify that said buyer payment information is valid for said particular sale amount;
  request a payment authorization hold for said buyer payment information for said particular sale amount;
  generate an identifier of a proposed transaction for a sale of the item;
  save in a computer-accessible memory a record comprising the identifier of the proposed transaction, a buyer identifier, a seller identifier, and requirements for confirming a completion of the proposed transaction;
  communicate the identifier of the proposed transaction to a first party to the proposed transaction according to said requirements, said first party comprising one of the buyer or the seller;
  receive from a second party to the proposed transaction a communication of a transaction identifier and of an identifier of said second party, said second party comprising one of the buyer or the seller, said second party comprising a party other than the first party;
  access said computer-accessible memory using said transaction identifier, access said requirements and according to said requirements, determine whether:
    the transaction identifier comprises the identifier of the proposed transaction, and
    the identifier of said second party matches the buyer identifier or the seller identifier, as required by said requirements; and
  for the transaction identifier that is verified to comprise the identifier of the proposed transaction, and for the identifier of said second party that matches the buyer identifier or the seller identifier, as required by said requirements:
    authorize a charge to an account associated with the buyer for said particular sale amount, and
    notify the buyer and the seller that the buyer has been successfully charged for said particular sale amount.

18. A computer-implemented method for confirming that a local marketplace transaction has been consummated, said computer-implemented method comprising using at least one computer device programmed, alone or in conjunction with other computer devices, to:
  receive from a buyer a first buyer input of a buyer identifier;
  receive from said buyer a second buyer input of an identification of an item for possible purchase from a particular seller in a contemplated transaction;
  generate at least one indicator for the contemplated transaction for a sale of the item;
  communicate said at least one indicator to a first party to the contemplated transaction, said first party comprising one of: the buyer, and the particular seller;
  save in a computer-accessible memory a relationship between the buyer identifier, an identification of the particular seller, and the identification of the item, and at least one transaction confirmation relationship between said at least one indicator, and at least one of: the buyer identifier, and the identification of the particular seller;
  receive from at least one party to the contemplated transaction at least one communication of a transaction-completion indicator and an identification of said at least one party, said at least one party comprising one of the buyer or the particular seller;
  for each communication received, determine whether the transaction-completion indicator matches said at least one indicator and determine whether the identification of said party matches at least one of: the buyer identifier and the identification of the particular seller according to said at least one transaction confirmation relationship; and for a match for each communication received between the transaction-completion indicator and said indicator, and for a match for each communication received between the identification of said party and at least one of the buyer identifier and the identification of the particular seller, according to said at least one transaction confirmation relationship, authorize a charge to an account associated with the buyer for a sale amount.

19. The computer-implemented method of claim 18, said computer-implemented method further comprising using said at least one computer device further programmed, alone or in conjunction with other computer devices, to:
   receive from said buyer a third buyer input of buyer payment information;
   verify that said buyer payment information is valid;
   request a payment authorization hold against said buyer payment information for a tentative sale amount associated with said item for a pre-established number of days; and
   wherein said receive from at least one party to the contemplated transaction at least one communication of the buyer identifier a transaction-completion indicator further comprises receiving an indication of an actual sale amount, and wherein said authorize a charge comprises authorizing a charge to an account associated with the buyer for said actual sale amount.

20. The computer-implemented method of claim 18:
   wherein said at least one indicator comprises a buyer acceptance indicator;
   wherein said at least one transaction confirmation relationship comprises said buyer acceptance indicator and the buyer identifier; and
   wherein said receive from at least one party to the contemplated transaction a communication of a transaction-completion indicator and an identification of said at least one party, comprises receiving a transaction-completion indicator that matches said buyer acceptance indicator and receiving an identification of said at least one party that matches the buyer identifier.

21. The computer-implemented method of claim 18, said computer-implemented method further comprising using said at least one computer device further programmed, alone or in conjunction with other computer devices, to:
   generate a second indicator for the contemplated transaction for the sale of the item;
   communicate said second indicator to a second party to the contemplated transaction, said second party comprising one of: the buyer, and the particular seller; and
   save in a computer-accessible memory a second transaction confirmation relationship between said second indicator and an identifier for at least one of: the buyer identifier, and the identification of the particular seller;
   wherein said at least one indicator comprises a buyer acceptance indicator and said second indicator comprises a seller transaction confirmation indicator;
   wherein said at least one transaction confirmation relationship comprises a buyer transaction confirmation relationship comprising said seller transaction confirmation indicator and the buyer identifier, and wherein said second transaction confirmation relationship comprises a seller transaction confirmation relationship comprising said buyer acceptance indicator and said identification of the particular seller; and
   wherein said receive from at least one party to the contemplated transaction a communication of a transaction-completion indicator and an identification of said at least one party, comprises receiving a first communication comprising a first transaction-completion indicator that matches said buyer acceptance indicator and that further comprises a first identification of said at least one party that matches the identification of the particular seller, and wherein said receive from at least one party to the contemplated transaction a communication of a transaction-completion indicator and an identification of said at least one party, further comprises receiving a second communication comprising a second transaction-completion indicator that matches said seller transaction confirmation indicator and that further comprises a second identification of said at least one party that matches the buyer identifier.

22. The computer-implemented method of claim 18:
   wherein said at least one indicator comprises a seller transaction confirmation indicator;
   wherein said at least one transaction confirmation relationship comprises said seller transaction confirmation indicator and the buyer identifier; and
   wherein said receive from at least one party to the contemplated transaction a communication of a transaction-completion indicator and an identification of said at least one party, comprises receiving a transaction-completion indicator that matches said seller transaction confirmation indicator and receiving an identification of said at least one party that matches the buyer identifier.

23. The computer-implemented method of claim 18, said computer-implemented method further comprising using said at least one computer device further programmed, alone or in conjunction with other computer devices, to:
   generate a second indicator for the contemplated transaction for the sale of the item;
   communicate said second indicator to a second party to the contemplated transaction, said second party comprising one of: the buyer, and the particular seller; and
   save in a computer-accessible memory a second transaction confirmation relationship between said second indicator and an identifier for at least one of: the buyer identifier, and the identification of the particular seller;
   wherein said at least one indicator comprises a buyer acceptance indicator and said second indicator comprises a seller transaction confirmation indicator;
   wherein said at least one transaction confirmation relationship comprises a buyer transaction confirmation relationship comprising said buyer acceptance indicator and the buyer identifier, and wherein said second transaction confirmation relationship comprises a seller transaction confirmation relationship comprising said buyer acceptance indicator and said identification of the particular seller; and
   wherein said receive from at least one party to the contemplated transaction a communication of a transaction-completion indicator and an identification of said at least one party, comprises receiving a first communication comprising a first transaction-completion indicator that matches said buyer acceptance indicator and that further comprises a first identification of said at least one party that matches the identification of the particular seller, and wherein said receive from at least one party to the contemplated transaction a communication of a transaction-completion indicator and an identification of said at least one party, further comprises receiving a second communication comprising a second transaction-completion indicator that matches said buyer acceptance indicator and that further comprises a second identification of said at least one party that matches the buyer identifier.

* * * * *